United States Patent
Rajani et al.

(10) Patent No.: US 11,558,488 B2
(45) Date of Patent: Jan. 17, 2023

(54) SYSTEM AND METHOD OF DYNAMIC AND SCALABLE IOT FRAMEWORK

(71) Applicant: Reliance Jio Infocomm Limited, Ahmedabad (IN)

(72) Inventors: Vishal Rajani, Mumbai (IN); Wai Yin Yee, Mumbai (IN); Mahesh Jena, Navi Mumbai (IN); Nitin Agarwal, Navi Mumbai (IN); Prateek Agarwal, Navi Mumbai (IN)

(73) Assignee: JIO PLATFORMS LIMITED

( * ) Notice: Subject to any disclaimer, the term of this patent is extended or adjusted under 35 U.S.C. 154(b) by 142 days.

(21) Appl. No.: 17/138,995

(22) Filed: Dec. 31, 2020

(65) Prior Publication Data

US 2021/0377361 A1 Dec. 2, 2021

(30) Foreign Application Priority Data

Dec. 31, 2019 (IN) .......................... 20192-10544703

(51) Int. Cl.
| | |
|---|---|
| *G06F 15/16* | (2006.01) |
| *H04L 67/60* | (2022.01) |
| *H04W 76/10* | (2018.01) |
| *H04W 12/06* | (2021.01) |
| *G16Y 40/00* | (2020.01) |
| *H04W 4/70* | (2018.01) |

(52) U.S. Cl.
CPC ............ *H04L 67/60* (2022.05); *H04W 12/06* (2013.01); *H04W 76/10* (2018.02); *G16Y 40/00* (2020.01); *H04W 4/70* (2018.02)

(58) Field of Classification Search
None
See application file for complete search history.

(56) References Cited

U.S. PATENT DOCUMENTS

| 2020/0092685 A1* | 3/2020 | Fehrenbach | ............ H04W 4/46 |
| 2021/0058766 A1* | 2/2021 | Aravamudhan | ........ H04W 4/14 |

* cited by examiner

*Primary Examiner* — Brian Whipple
*Assistant Examiner* — Gregory P Tolchinsky
(74) *Attorney, Agent, or Firm* — Finnegan, Henderson, Farabow, Garrett & Dunner, LLP

(57) ABSTRACT

A method and a system for providing one or more services to one or more user devices [202] in an IoT network in a scalable M2M (Machine to Machine) framework. The method comprises receiving a connection request from the one or more user devices [202] at a load balance of the IoT network, the connection request comprises at least a username comprising a cluster identifier. The load balancer [204] determines a cluster identifier based on the connection request and identifies at least one target cluster from the one or more clusters [206], said target cluster being associated with the identifier cluster identifier. The load balancer [204] routes the connection request to the at least one target cluster to provide the one or more services to the one or more user devices [202].

16 Claims, 11 Drawing Sheets

SYSTEM AND METHOD OF DYNAMIC AND SCALABLE IOT FRAMEWORK

TECHNICAL FIELD

The present invention generally relates to Heterogenous Networks (HetNet) and more particularly relates to providing one or more services to one or more user devices in an IoT network in a scalable M2M (Machine to Machine) framework.

BACKGROUND OF THE INVENTION

The following description of related art is intended to provide background information pertaining to the field of the invention. This section may include certain aspects of the art that may be related to various features of the present invention. However, it should be appreciated that this section be used only to enhance the understanding of the reader with respect to the present invention, and not as admissions of prior art.

In a traditional cellular deployment, service operators are now reinforcing their macro-cells deployment with one or multiple low powered small cellular cells (generally termed as Femto/Pico/Micro cells) placed at multiple strategic locations within one or more macro coverage areas. This kind of reinforced cellular network is generally termed as Heterogeneous Network, in short, HetNet. For a typical HetNet, strategic locations for small cells generally include areas with high density of users, such as shopping malls, airports, railway/bus stations, colleges, etc. Also, these locations might include areas with dead-spots, or areas with low macro signal strength, such as indoor establishments or peripheral locations of a macro coverage area. HetNet provides increased mobile data capacity along with providing better mobile coverage, thereby enhancing the overall user's mobile broadband experience.

Wi-Fi technology has witnessed tremendous growth and commercialization in the recent years. Almost all the available user devices (or user equipment) with cellular capability support also tend to have Wi-Fi capability in order to connect to Wi-Fi networks operating in the unlicensed frequency bands, either 2.4 GHz or 5 GHz. Therefore, the cellular operators are motivated to use ubiquitous and cost-effective Wi-Fi technology in pursuing the overall HetNet strategy, for instance, deploying low powered Wi-Fi cells along with cellular small cells at multiple strategic locations identified for a HetNet. Further, for ease of maintenance and provision, few operators are also beginning to use Wi-Fi integrated versions of small cellular cells, wherein a Wi-Fi and cellular small cell technology are made available on common equipment.

The Internet of Things (IoT)/M2M (machine to machine) is a network of devices, vehicles, home appliances, and other items embedded with electronics, software, sensors, actuators, and connectivity which can be readable, recognizable, locatable, addressable, and controllable via an IoT communications network that enables these things to connect and exchange data, creating opportunities for more direct integration of the physical world into computer-based systems, resulting in efficiency improvements, economic benefits, and reduced human exertions. The "Internet of things" (IoT) concept getting more and more popular, devices, such as sensors, actuators and everyday objects including the coffee makers, washing machines, headphones, lamps and wearable devices, etc. are being increasingly looked upon as potential IoT devices. IoT involves extending internet connectivity beyond standard devices, such as desktops, laptops, smartphones and tablets, to any range of traditionally dumb or non-internet-enabled physical devices and everyday objects. Embedded with technology, these devices can communicate and interact over the Internet, and they can be remotely monitored and controlled. The term "Enterprise IoT" refers to devices used in business and corporate settings in a network of physical objects that contain embedded technology to communicate and sense or interact with their internal states or the external environment. Here, IoT refers to Internet-connected physical devices, in many cases everyday objects (things) that can communicate their status, respond to events, or even act autonomously. This enables communication among those things, closing the gap between the real and the virtual world and creating smarter processes and structures that can support us without needing our attention. IoT has evolved from the convergence of wireless technologies, micro-electromechanical systems (MEMS), and the Internet. An IOT device is generally provisioned with an IP address to provide it with the capability of transferring data and receive control signals over an IP network using the standard Internet protocols such as TCP/IP which is being exclusively used on the Internet.

The M2M/IoT technology focuses on devices like meter reading of water and electricity consumption that are stationery. Some of the use cases are facility management services, fire alarms for home and commercial properties, tracking of persons and objects. The industries where M2M/IoT services can add value are: Smart city, smart home, Safety and security, agriculture, health care and Energy. Another example for IoT industry includes logistic tracking. The tracking devices on shipping containers send huge volumes of sensor data that are collected and taken for analysis in order to make sure that real time tracing of shipment locations can be made possible. The output display units are used for receiving alerts and optimized with service recommendations.

A Machine to Machine (M2M)/Internet of Things (IOT) Service Layer is an example of one type of Service Layer specifically targeted towards providing value-added services for M2M/IoT type devices and applications. Recently, several industry standards bodies (e.g., ETSI M2M, oneM2M) have been developing M2M/IoT Service Layers to address the challenges associated with integration of M2M/IoT types of devices and applications into deployments such as the Internet/Web, cellular, enterprise, and home network. An M2M Service Layer can provide applications and devices access to a collection of M2M centric capabilities supported by the Service Layer. A few examples include security, charging, data management, device management, discovery, provisioning, and connectivity management. These capabilities are made available to applications via APIs which make use of message formats, resource structures and resource representations defined by the M2M Service Layer. Another example of a Service Layer is the IP Multimedia Subsystem (IMS) Service Layer specifically targeted to providing multimedia services for mobile network devices.

A service refers to a defined set of functionality or capabilities that is made available and accessible in a network environment. Devices and/or software applications transmit requests to the service which performs the desired function for the particular device or application. Services are employed in a wide variety of technical environments. For example, services are used extensively in Web related technologies. A Web service with a particular function may be made available at a particular network address. Systems that require the particular functionality may transmit a request via the Web to the web service, which then performs the desired function. In an example scenario, a Web service may be employed by one system to exchange data with an otherwise incompatible system.

Services are also widely used in the context of machine to machine (M2M) and internet of things (IoT) technologies. Machine to machine (M2M) is a broad label that is used to describe technology that enables networked devices to exchange information and perform actions without the manual assistance of humans. The Internet of Things (loT) refers to a scenario in which objects, including machines and components of machines, are provided with unique identifiers and the ability to automatically transfer data between objects over a network without requiring human-to-human or human-to-computer interaction. Services are used to provide access to M2M capabilities including those related to, for example, security, charging, and data management. Services may be thought of as existing in a "service layer" of a network architecture. The service layer is positioned on top of the network layer, which enables the services in the services layer to make use of the capabilities of the network layer. The services layer is positioned below a client application layer. Client applications make requests to the services in the services layer in order to access the functionality made available by the services. Accordingly, the service layer is a middleware layer that supports value-added service capabilities through a set of application programming interfaces and underlying networking interfaces.

Various attempts are being made to define standard service operations for facilitating M2M communications and delivery of services. Some of these existing M2M/IoT service layer operating procedures define a set of service capabilities that can be supported by individual service layers hosted by service nodes in a network (e.g., servers, gateways, devices). While the use of services has been widely adopted, managing services is largely a manual activity. Creating and modifying the services often requires human intervention to provision individual machines with the appropriate data and software in order to provide the desired services.

The existing arts broadly comprises of below enlisted frameworks for M2M/IoT platform. Firstly, Stateless Protocol are a type of network protocols in which Client send request to the server and the server response back according to current state. It does not require the server to retain session information or a status about each communicating partner for multiple request. Secondly, in a Stateful Protocol, if client send a request to the server then it expect some kind of responses, if it does not get any response then it resends the request. Further, existing solutions also provide methods to support stateful connections broker (SCB) to support bi-directional data flow.

FIGS. 1A and 1B illustrate an exemplary SCB ring structure 100 and a tree structure 150, respectively, for stateful connection in a M2M framework. In the SCB (Ring Structure) 100 depicted in FIG. 1A, a stateful connections broker (SCB) cluster 110 is a distributed system that represents one logical stateful connections broker (SCB). It consists of multiple different stateful connections broker (SCB) nodes 111-113 that are typically installed on different physical machines and are connected over a network. From a stateful connections broker (SCB) client's (e.g., 121-123) perspective, a cluster 110 of brokers behaves like a single stateful connections broker (SCB). The nodes 111-113 are connected as adjacent nodes in a ring style cluster. This structure can be optimized, but due to some metadata process, this architecture get limitation after a scale. With reference to FIG. 1B, the Tree Structure 150 supports multiple stateful connections like stateful connections broker (SCB). In this solution, connection request 160 can come to any data, but meta data and other data will be controlled by a Master node 190 via Intermediate nodes 181-182 and edge nodes 171-174 to support scale.

SUMMARY

This section is provided to introduce certain objects and aspects of the present invention in a simplified form that are further described below in the detailed description. This summary is not intended to identify the key features or the scope of the claimed subject matter. In order to overcome at least a few problems associated with the known solutions as provided in the previous section, an object of the present invention is to provide a system and a method for providing one or more services to one or more user devices in a scalable M2M network. Another object of the present invention is to provide a system and method that can support cognitive solution for numerous IoT devices within a single common framework capable of scaling up. Yet another object of the present invention is to provide a system and a method for facilitating M2M-related platforms to communicate with each other.

In order to achieve at least some of the above-mentioned objectives, the present invention provides a method and system for providing one or more services to one or more user devices in an IoT network. A first aspect of the present invention relates to a method for providing one or more services to one or more user devices in an IoT network. The method comprises receiving, at a load balancer of the IoT network, a connection request from the one or more user devices, wherein the IoT network comprises of one or more clusters, each of the one or more clusters is associated with a unique cluster identifier. The connection request comprises at least a username comprising a cluster identifier. The connection request is stateful request, and the one or more user devices being associated with a cluster identifier assigned by the authentication server. Next, the load balancer determines a cluster identifier based on the connection request. Subsequently, the load balancer routes the connection request to at least one target cluster from the one or more clusters based on the determined cluster identifier to provide the one or more services to the one or more user devices.

Another aspect of the present invention relates to a system for providing one or more services to one or more user devices in an IoT network. The system comprises one or more clusters and a load balancer, said components are connected to each other and working in conjunction to achieve the objects of the present invention. The one or more clusters is configured to provide the one or more services to the one or more user devices, wherein each of the one or more clusters is associated with a unique cluster identifier. The load balancer is configured to receive a connection request from the one or more user devices, wherein the connection request comprises at least a username comprising a cluster identifier. The connection request is stateful request, and the one or more user devices being associated with a cluster identifier assigned by the authentication server. The load balancer is also configured to determine a cluster identifier based on the connection request. The load balancer is further configured to route the connection request to at least one target cluster from the one or more clusters based on the determined cluster identifier.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1A:
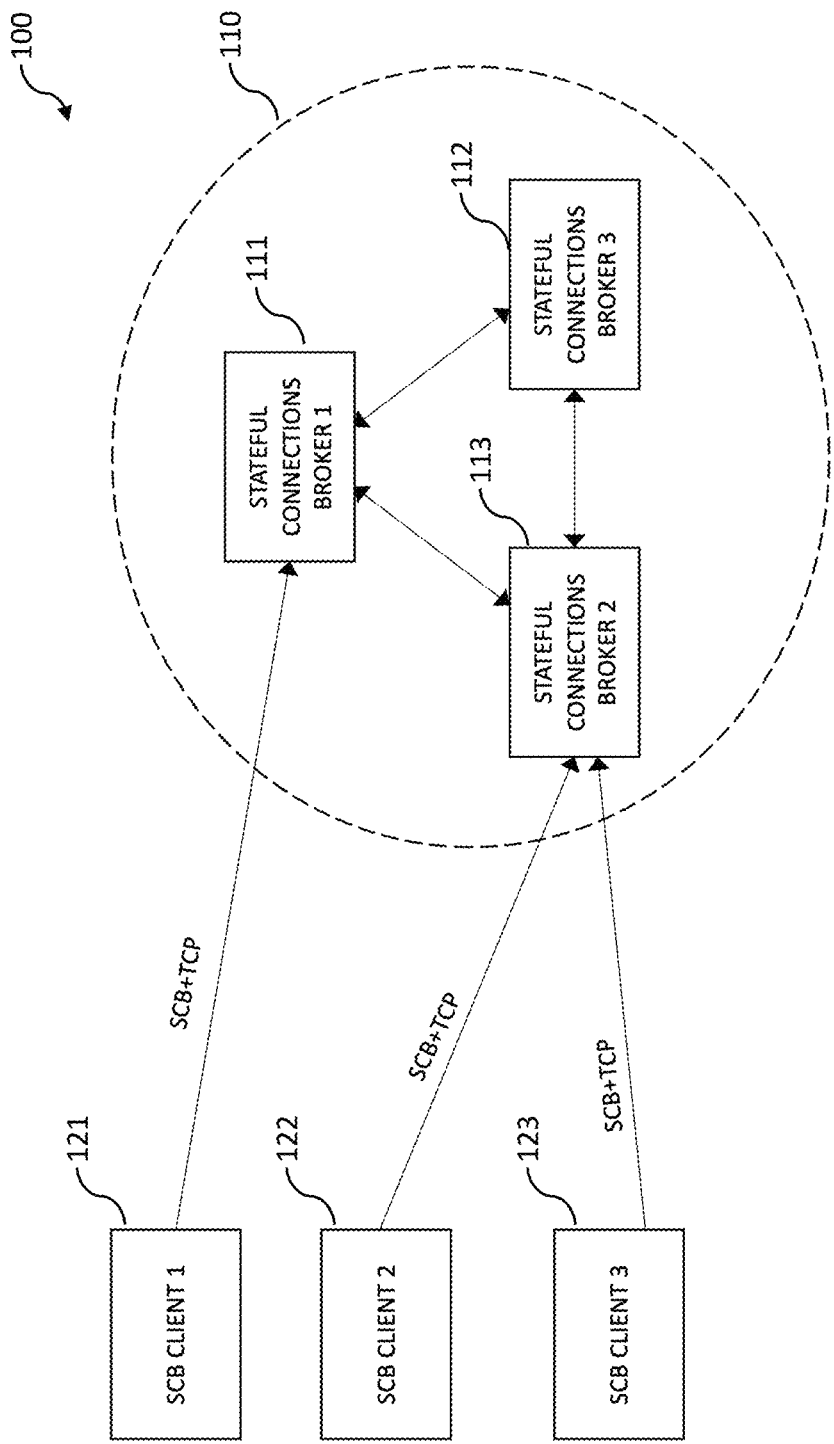
FIGS. 1A and 1B illustrate an exemplary a SCB ring structure and a tree structure, respectively, for stateful connection in a M2M framework.

The foregoing shall be more apparent from the following more detailed description of the disclosure.

DETAILED DESCRIPTION OF THE EXEMPLARY EMBODIMENTS

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.'

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Moreover, terms like "smart computing device", "user device", "device", "smart mobile communications device", "mobile communication device", "mobile device", "mobile subscriber station," "access terminal," "terminal," "handset," "originating device," "terminating device," and similar terminology refers to any electrical, electronic, electromechanical computing device or equipment or a combination of one or more of the above devices. Smart computing devices may include, but not limited to, a mobile phone, smartphone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user-configured, computer networked device that can be operated autonomously. A smart computing device is one of the appropriate systems for storing data and other private/sensitive information. The smart computing device operates at all the seven levels of ISO reference model, but the primary function is related to the application layer along with the network, session and presentation layer. The smart computing device may also have additional features of a touch screen, apps ecosystem, physical and biometric security, etc. Further, a 'smartphone' is one type of "smart computing device" that refers to the mobility wireless cellular connectivity device that allows end users to use services on cellular networks such as including but not limited to 2G, 3G, 4G, 5G and/or the like mobile broadband internet connections with an advanced mobile operating system which combines features of a personal computer operating system with other features useful for mobile or handheld use. These smartphones can access the Internet, have a touchscreen user interface, can run third-party apps including capability of hosting online applications, music players and are camera phones possessing high-speed mobile broadband 4G LTE internet with video calling, hotspot functionality, motion sensors, mobile payment mechanisms and enhanced security features with alarm and alert in emergencies. Mobility devices may include smartphones, wearable devices, smart-watches, smart bands, wearable augmented devices, etc. For the sake of specificity, the mobility device is referred to both feature phone and smartphones in present disclosure but does not limit the scope of the disclosure and may extend to any mobility device in implementing the technical solutions. The above smart devices including the smartphone as well as the feature phone including IoT devices enable the communication on the devices. Further, the foregoing terms are utilized interchangeably in the subject specification and related drawings.

Furthermore, the terms "user," "subscriber," "customer," "consumer," "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

Figure 1B:
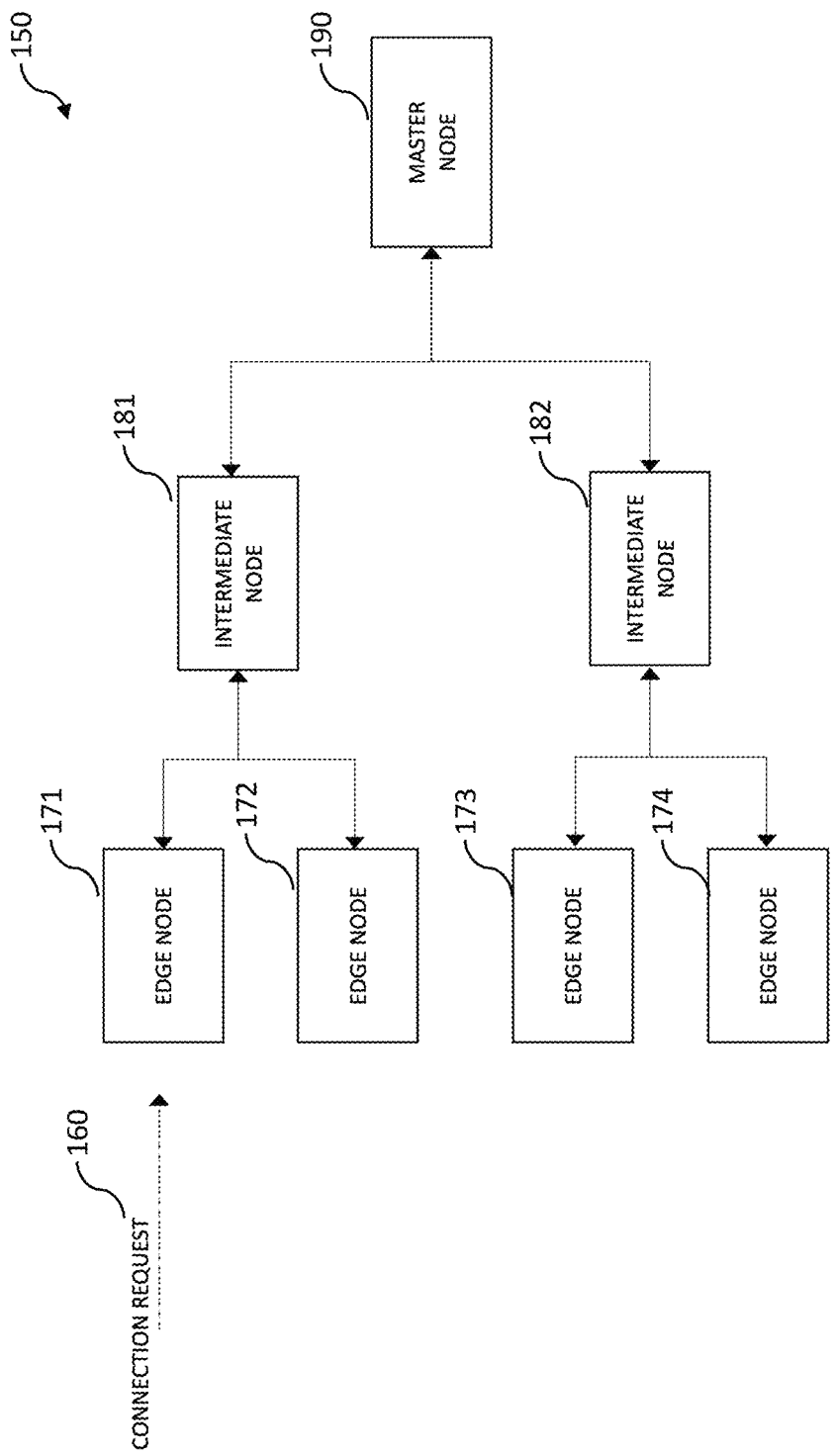

FIGS. 1A and 1B illustrate an exemplary SCB ring structure and a tree structure, respectively, for stateful connection in a M2M framework, known by way of existing solutions. However, as number of users of the IoT devices are growing in number tremendously, defining explicit rules across devices while also understanding each device capabilities is becoming more tedious and has a steep learning curve for end user. Thus, parsing IoT data for defining and understanding explicit rules across devices is becoming a legitimate concern, and none of the existing frameworks is capable of supporting such M2M gateway, in fact, there is no single platform capable of scaling the solution once load increases (say, to more than ~2 Billion devices). Thus, the existing solutions fail to provide a scalable M2M framework that supports authentication and authorization for multi-distribution messaging to N-number of publish and subscribe business verticals.

Thus, in order to resolve the above highlighted and other inherent limitations in the existing solutions, the present invention provides a system and a method for providing one or more services to one or more user devices in a scalable M2M framework. The solution of the present invention provides a single common framework capable of scaling up without changing the endpoints on the user device end. The solution of the present invention additionally allows M2M-related platforms to communicate with each other and to scale horizontally using a clustered 'plug and play' concept by routing the connection requests from a load balancer to different platforms (clusters) and simultaneously connect to multiple clustered platforms.

Hereinafter, exemplary embodiments of the present disclosure will be described in detail with reference to the accompanying drawings so that those skilled in the art can easily carry out the present disclosure.

Figure 2:
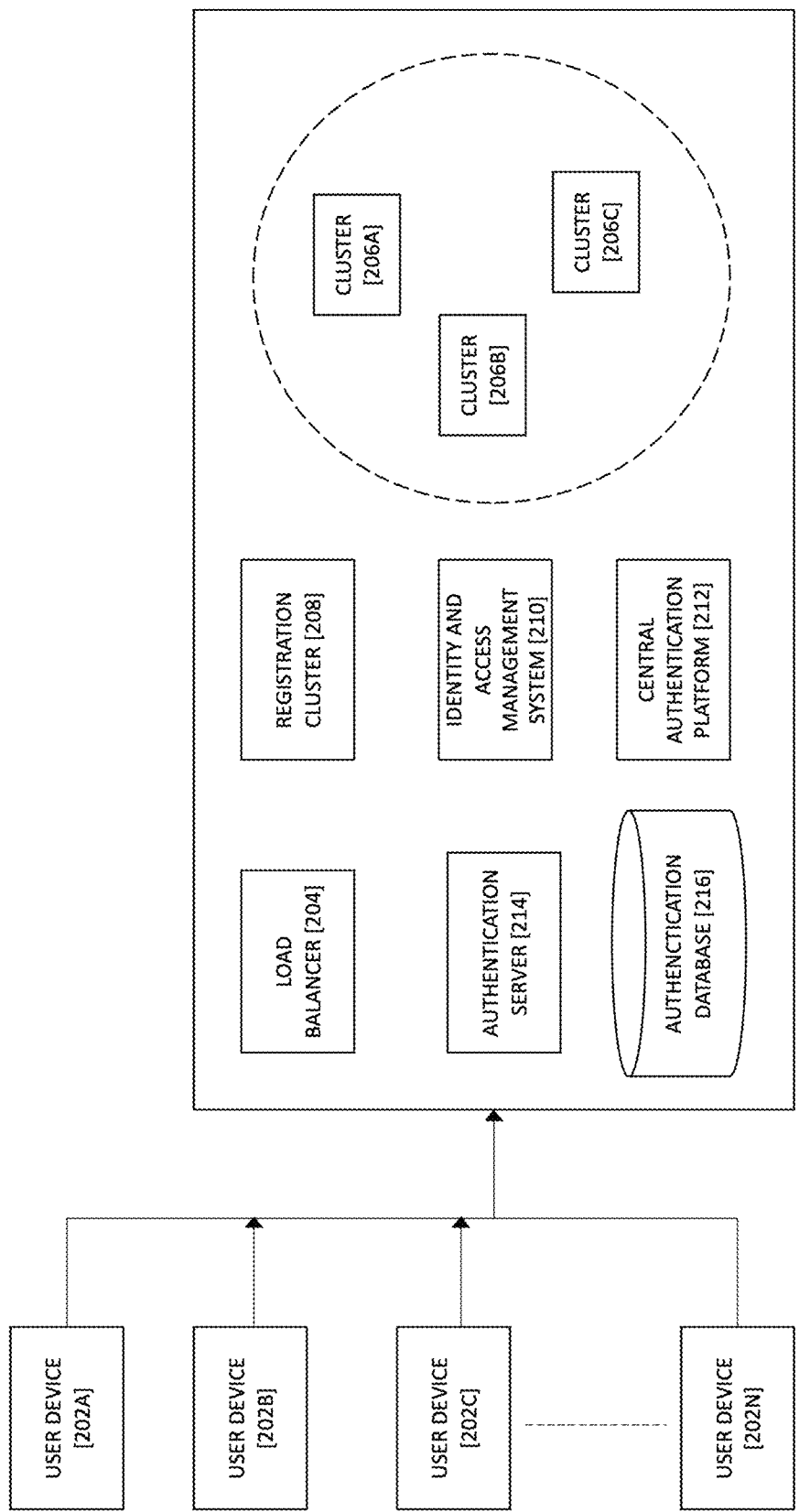
FIG. 2 illustrates an exemplary block diagram of a system for providing one or more services to one or more user devices in an IoT network, in accordance with exemplary embodiments of the present invention

Referring to FIG. 2 illustrates an exemplary block diagram of a system for providing one or more services to one or more user devices [202] in an IoT network, in accordance with exemplary embodiments of the present invention. The system comprises of one or more clusters [206], a load balancer [204], a registration cluster [208], a Identity and Access Management System (IDAM [210]), an authentication server [214], a central authentication platform [212] and an authentication database [216], all the components connected to each other unless otherwise indicated and working together to achieve the objectives of the present invention.

The IDAM [210] is configured to receive, from the one or more user devices [202], authentication request (for e.g., a Zero Level Authentication (ZLA) request) comprising the user device identifier prior to receiving the registration request. The IDAM [210] is further configured to request the central authentication platform [212] for issuance of a token pursuant to receiving the authentication request (e.g., ZLA request). The central authentication platform [212] is configured to validate a connection capability of the one or more user devices [202] and assign a token to the one or more user devices [202], said token being associated with a time period. The central authentication platform [212] shares the token with the IDAM [210]. The IDAM [210] is further configured to transmit the token to the one or more user devices [202]. The present invention also encompasses that the one or more user devices [202] is configured to requests the central authentication platform [212] for a new token upon an expiry of the time period of the token.

The load balancer [204] is further configured to receive a first registration request from the one or more user devices [202] prior to receiving the connection request. The present invention encompasses that the first registration request comprises at least a user device identifier. The load balancer [204] then routes the first registration request to a registration cluster [208] based on the user device identifier. The registration cluster [208] is configured to receive the first registration request from the load balancer [204]. The load balancer [204] assigns a username and a password to the one or more user devices [202]. The present invention encompasses that the username is a combination of at least a cluster identifier and the user device identifier, and the password is an encrypted combination of the user device identifier and the username. The registration cluster [208] is further configured to transmit the password and the username to the one or more user devices [202]. In an instance of the present invention, the first registration request received at the load balancer [204] further comprises of the token assigned to the one or more user devices [202] by the IDAM [210]. Accordingly, the registration cluster [208] is further configured to validate the first registration request based on the token, wherein the username and the password is assigned to the one or more user devices [202] based on the validation.

In another instance of the present invention, the load balancer [204] routes the first registration request to an authentication server [214] when the one or more user devices [202] is connecting with the IoT network for the first time. The authentication server [214] is configured to receive the first registration request from the load balancer [204]. The authentication server [214] assigns a username and a password to the one or more user devices [202]. The authentication server [214] is further configured to transmit the password and the username to the one or more user devices [202].

The load balancer [204] is also configured to receive a connection request from the one or more user devices [202]. The present application also encompasses that the connection request comprises at least a username comprising a cluster identifier. The present invention also encompasses that the connection request is stateful request (e.g., stateful connections broker (SCB) request). The present invention also encompasses that in an instance, the one or more user devices [202] is associated with a cluster identifier assigned by the authentication server [214], such assignment being made prior in time. The load balancer [204] is further configured to determine a cluster identifier based on the connection request. The present invention encompasses that the load balancer [204] processes the connection request to identify the cluster identifier. In an instance, the load balancer [204] processes and decrypts the username contained in the connection request to identify a cluster identifier.

The load balancer [204] is further configured to route the connection request to at least one target cluster from the one or more clusters [206] based on the determined cluster identifier to provide the one or more services to the one or more user devices [202]. Thus, subsequent to determining the cluster identifier, the load balancer [204] identifies at least one target cluster from the one or more clusters [206] of the IoT network. In an instance, the load balancer [204] identifier the target cluster from the one or more clusters [206] of the IoT network based on a comparison of the identifier cluster identifier with a pre-stored list of cluster identifiers of the one or more clusters [206] of the IoT network. Based on a successful matching of the identifier cluster identifier with an item of the pre-stored list of cluster identifiers, the load balancer [204] identifier the at least one target cluster, and accordingly, routes the connection request to the at least one target cluster which provides the one or more services to the one or more user devices [202].

The one or more dusters [206] is configured to provide the one or more services to the one or more user devices [202]. The present invention encompasses that the clusters, in an instance, is an application server (or a group of application servers) for handling application-specific requests received from the user device. These Application servers are directly connected to the corresponding Cluster and, thus, the connection help in reducing the multi-cluster communication for the Application Servers. It also helps in designing a single communication platform which can cater to multiple application use cases by giving each of them a cluster of their own data platform. Further, the present invention encompasses that the at least one cluster is further configured to receive the connection request from the load balancer [204]. The at least one cluster is further configured to decrypt the second connection request using a shared public key and to provide the one or more services to the one or more user devices [202] based on the decryption.

Figure 3:
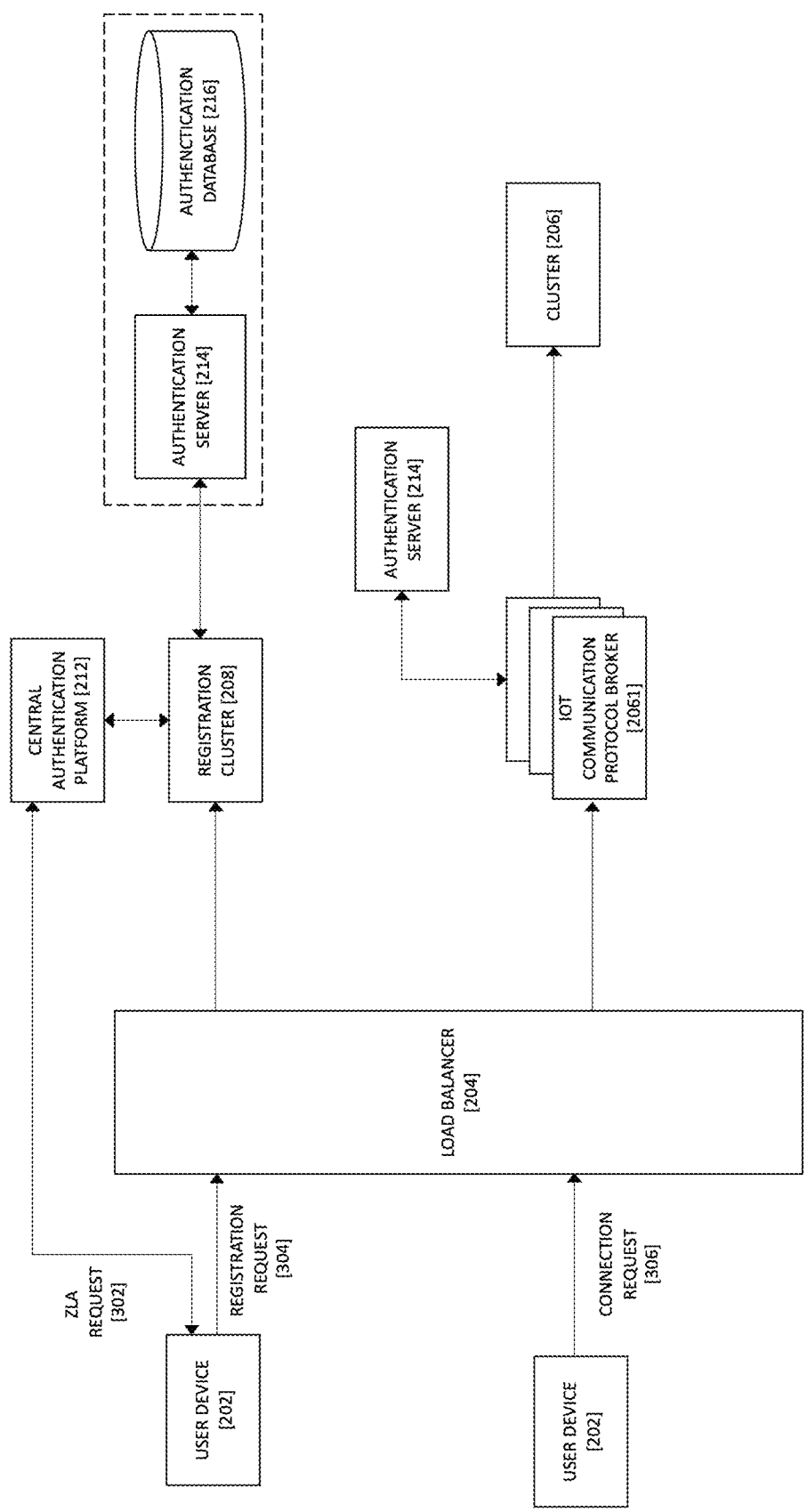
FIG. 3 illustrates an exemplary block diagram of a M2M Framework platform, in accordance with exemplary embodiments of the present invention.

Referring to FIG. 3 illustrates an exemplary block diagram of a M2M Framework platform, in accordance with exemplary embodiments of the present invention. As illustrate, the one or more user devices [202] is capable of transmitting an authentication request (e.g., ZLA request) [302], a registration request [304] and a connection request [306]. The one or more user devices [202] are configured to transmit and receive data (or information) to and from the IoT network (e.g., the Application server) respectively.

The central authentication platform [212] receives the authentication request (e.g., ZLA request) [302] from the one or more user devices [202] via the IDAM [210]. The central authentication platform [212] also determines that the one or more user devices [202] is a part of an organization (e.g., a business entity) based on an IMEI or a RSN number of the one or more user device. The central authentication platform [212] also assigns a token to the one or more user devices [202] based on a successful Zero Level Authentication.

The one or more clusters [206] provide the one or more services to the one or more user devices [202]. The present invention encompasses that the clusters, in an instance, is an application server (or a group of application servers) for handling application-specific requests received from the user device. The application servers are directly connected to the corresponding cluster and, thus, the connection help in reducing the multi-cluster communication for the application servers. It also helps in designing a single communication platform which can cater to multiple application use cases by giving each of them a cluster of their own data platform. The cluster further comprises of an IoT Communication Protocol Broker for managing the communication protocol between backend and clients.

The authentication server [214] receives a registration request from the load balancer [204] for the one or more user devices [202] connecting to the IoT network for the first time. The Authentication server [214] verifies the client with its own Identification server and creates new username and Password for the client. The username is combination of a unique UUID and the Cluster identifier with which the Client will be going to connect every time. Next time when client sends connection request along with the given username and password, the Load balancer [204] takes care of routing the request to the Registration cluster [208]. The method helps in avoiding design of inter-cluster communication and makes the architecture simpler.

The Authentication database [216] is configured to store the username and the password assigned by the Authentication server [214] or the Registration cluster [208] to the one or more user devices [202]. The Authentication database [216] is a distributed database shared with all the clusters for connection request verification.

Figure 4:
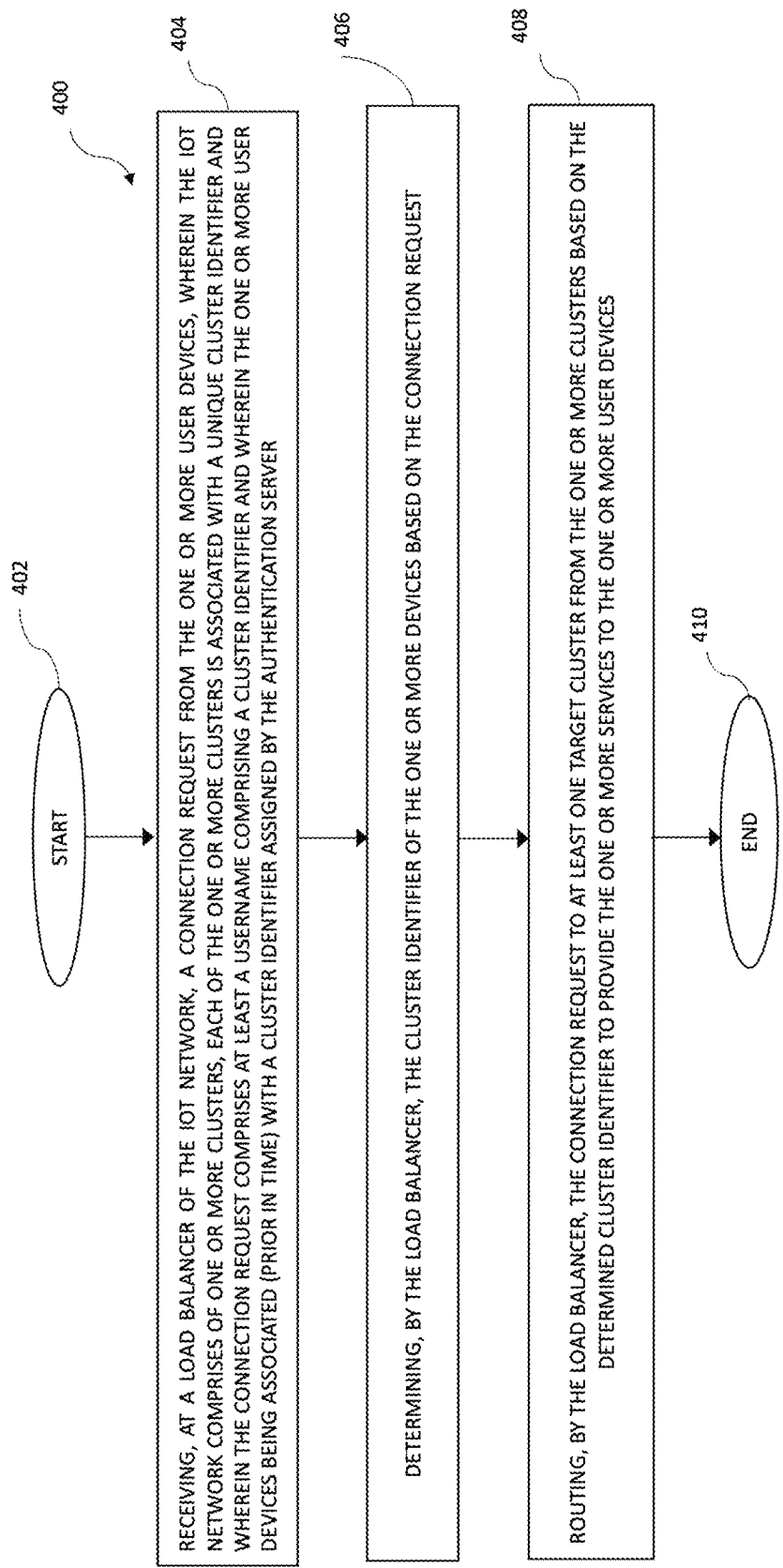
FIG. 4 illustrates an exemplary method flow diagram depicting a method for providing one or more services to one or more user devices in an IoT network, in accordance with exemplary embodiments of the present invention.

Referring to FIG. 4 illustrates an exemplary method flow diagram depicting a method for providing one or more services to one or more user devices [202] in an IoT network, in accordance with exemplary embodiments of the present invention. The present invention encompasses that the one or more services are provided to the one or more user devices [202], for instance, in a scalable M2M framework that supports authentication and authorization for multi-distribution messaging to publish and subscribe the one or more user devices [202]. The method of the present invention starts at step [402].

At step [404], a connection request is received from the one or more user devices [202] at a load balancer [204] of the IoT network. The present invention encompasses that the IoT network comprises of one or more clusters [206], each of the one or more clusters [206] is associated with a unique cluster identifier, and that each of the one or more clusters [206] is configured to provide one or more services to a user device, for e.g., each of the cluster is an application server for handling application-specific requests received from the user device. The present application also encompasses that the connection request comprises at least a username comprising a cluster identifier. The present invention also encompasses that the connection request is stateful request (e.g., stateful connections broker (SCB) request). The present invention also encompasses that in an instance, the one or more user devices [202] is associated with a cluster identifier assigned by the authentication server [214], such assignment being made prior in time before initiation of the method at step [402].

At step [406], the load balancer [204] determines a cluster identifier based on the connection request. The present invention encompasses that the load balancer [204] processes the connection request to identify the cluster identifier. In an instance, the load balancer [204] processes and decrypts the username contained in the connection request to identify a cluster identifier.

At step [408], the load balancer [204] routes the connection request to at least one target cluster from the one or more clusters [206] based on the determined cluster identifier to provide the one or more services to the one or more user devices [202]. Thus, subsequent to identifying the cluster identifier, the load balancer [204] also identifies at least one target cluster from the one or more clusters [206] of the IoT network. In an instance, the load balancer [204] identifier the target cluster from the one or more clusters [206] of the IoT network based on a comparison of the identifier cluster identifier with a pre-stored list of cluster identifiers of the one or more clusters [206] of the IoT network. Based on a successful matching of the identifier cluster identifier with an item of the pre-stored list of cluster identifiers, the load balancer [204] identifier the at least one target cluster, and accordingly, routes the connection request to the at the at least one target cluster which provides the one or more services to the one or more user devices [202]. Thereafter, the method completes at step [410].

The method of the present invention further encompasses that, upon receiving the connection request from the load balancer [204] at the at least one target cluster. Next, the at least one target cluster decrypts the second connection request using a shared public key and provides the one or more services to the one or more user devices [202] based on the decryption.

The method of the present invention also encompasses that prior to receiving the connection request and the initiation of the method at step [402], a first registration request is received from the one or more user devices [202] at the load balancer [204] of the IoT network. The present invention encompasses that the first registration request comprises at least a user device identifier. The load balancer [204] transmits the first registration request to a registration cluster [208]. Next, the registration cluster [208] assigns the username and the password to the one or more user devices [202]. It is the username and the password to the one or more user devices [202] by the authentication server [214] that is transmitted by the one or more user devices [202] in the connect request. The present invention encompasses that the username is a combination of at least a cluster identifier and the user device identifier. The present invention also encompasses that the password is an encrypted combination of the user device identifier and the username. Next, the registration cluster [208] transmits the password and the username to the one or more user devices [202].

In an instance, the method comprises receiving an authentication request (e.g., ZLA request) from the one or more devices prior to receiving the registration request. The authentication request (e.g., ZLA request) comprises at least the user device identifier. Next, a central authentication platform [212] validates a connection capability of the one or more user devices [202] based on the user device identifier and assigns a token to the one or more user devices [202], said token being associated with a time period. The present invention encompasses that the first registration request received at the load balancer [204] further comprises of the token assigned by the central authentication platform [212], and that the method of the present invention is implementable during the lifetime period of the timer. Subsequently, the registration cluster [208] validates the first registration request based on the token, wherein the username and the password are assigned to the one or more user devices [202] based on the validation. In another instance, the present invention encompasses that the one or more user devices [202] requests the central authentication platform [212] for a new token upon an expiry of the time period of the token.

Figure 5:
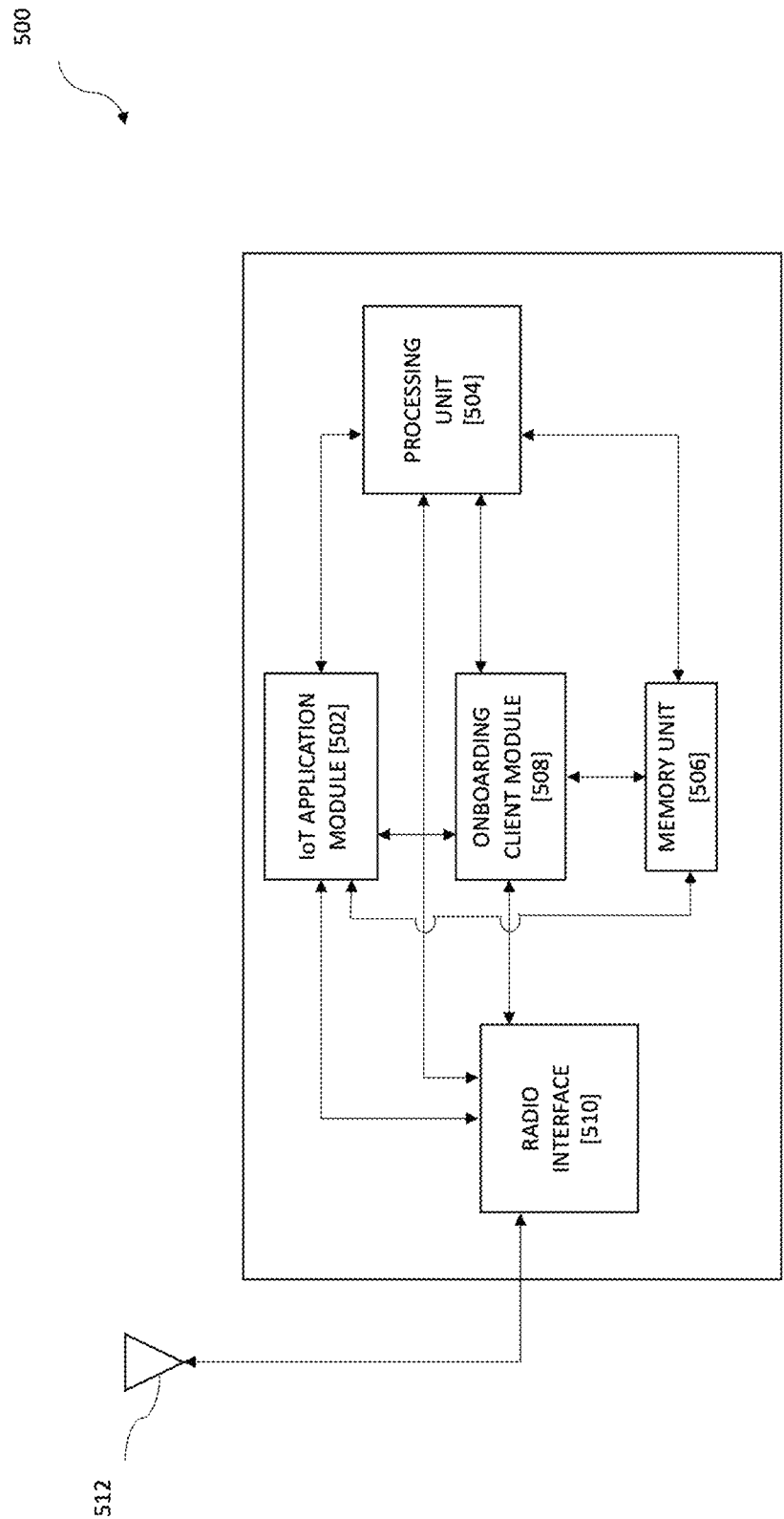
FIG. 5 illustrates an exemplary block diagram of an IoT device, in accordance with exemplary embodiments of the present invention.

Referring to FIG. 5, an exemplary IoT device [500], in accordance with exemplary embodiments of the present disclosure is shown. The IoT device [102] comprises at least one radio interface [510], at least one antenna [512], at least one IoT application module [502], at least one memory unit [506], at least one on-boarding client module [508] and at least one processing unit [504], said components being connected to each other. Furthermore, in an exemplary implementation the system [200] of the present invention is implemented at the IoT device [500] (not shown in the FIG. 4), for remote (subscriber identity module) SIM profile provisioning management at the IoT device [500].

Further the radio interface [510] and the antenna [512] of the IoT device [500] are configured to enable a wireless communication over an IoT network to implement the features of the present invention. The IoT application module [502] is a primary IoT application module configured to implement primary IoT functionality in combination with multiple hardware and software components. The IoT application module [502] communicates over the desired IP network via the radio interface [510].

The on-boarding client module [508] is configured to communicate to one or more on boarding servers via the radio interface [510] and is in charge of device specific on-boarding function. Furthermore, both the IoT application module [502] and the on-boarding client module [508] are configured to interact with the memory unit [506] for storage management. Also, all units/modules present at the IoT device [500] are configured to use the processing unit [504] to execute their respective functions.

Figure 6:
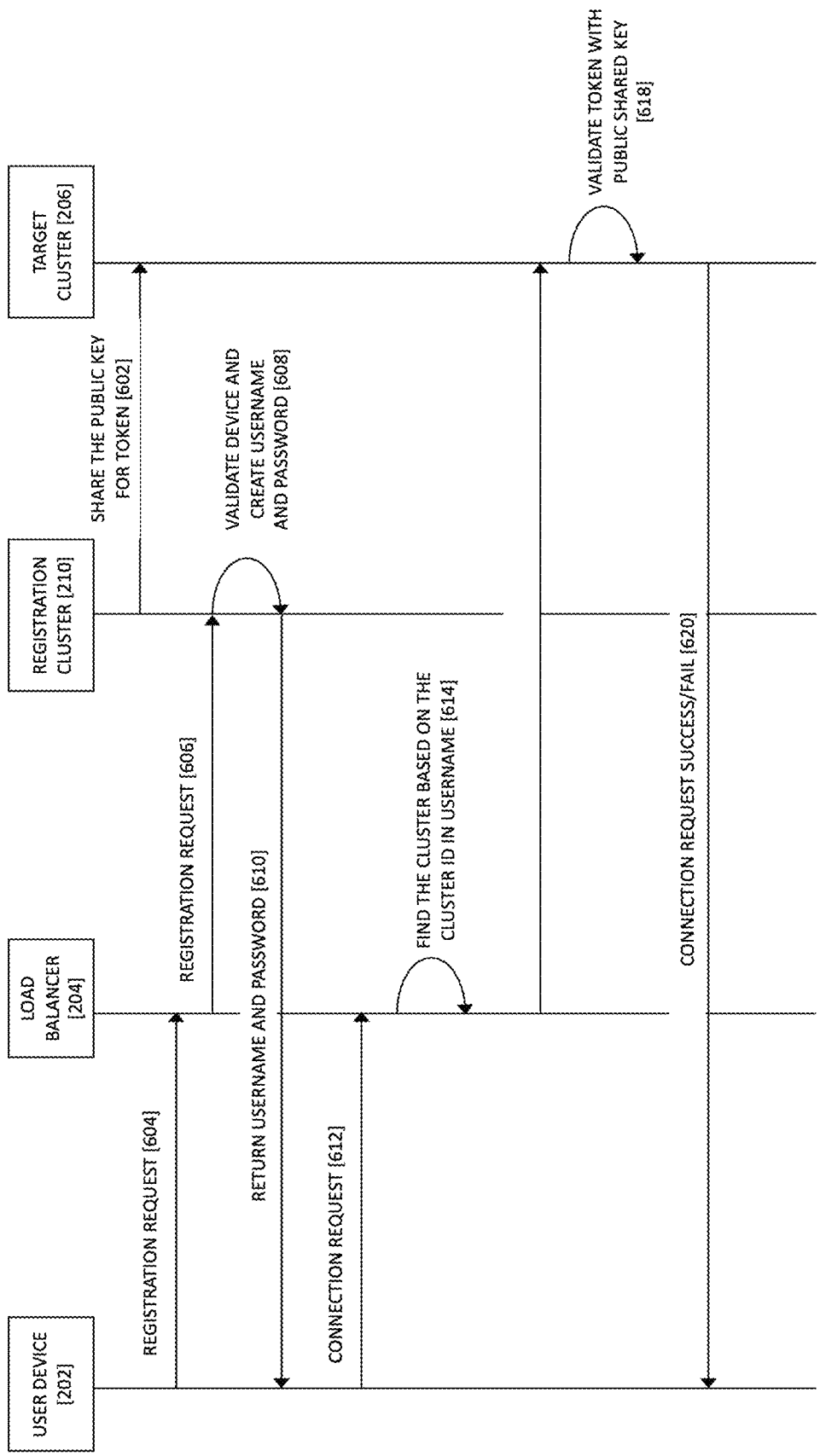
FIG. 6 illustrates an exemplary signal flow diagram for M2M/IoT Framework SIP interaction, in accordance with exemplary embodiments of the present invention.

Referring to FIG. 6 illustrates an exemplary signal flow diagram for M2M/IoT Framework SIP interaction, in accordance with exemplary embodiments of the present invention. At 602, prior to implementation of the method of the present invention, a public key is shared with each of the one or more clusters [206] of the IoT network. At 604, a first registration request is received from the one or more user devices [202] at the load balancer [204]. Based on processing the first registration request, the load balancer [204] redirects the first registration request to the registration cluster [208] at 606. At 608, the registration cluster [208] validates the one or more user devices [202] and creates a username and a password for each of the one or more user devices [202]. At 610, the registration cluster [208] transmits the username and the password to the one or more user devices [202].

Next, at 612, a connection request is received from the one or more user devices [202] at the load balancer [204]. At 614, the load balancer [204] processes the username in the connection request to identify a cluster identifier and a target cluster associated with the cluster identifier. Based on the identification, at 616, the load balancer [204] directs the connection request to the target cluster. At 618, upon receiving the connection request, the target cluster validates the connection request based on the public key previously shared with the clusters. At 620, the target cluster intimates the one or more user devices [202] of the connection status based on the validation, that whether the connection was successful or failed.

Figure 7:
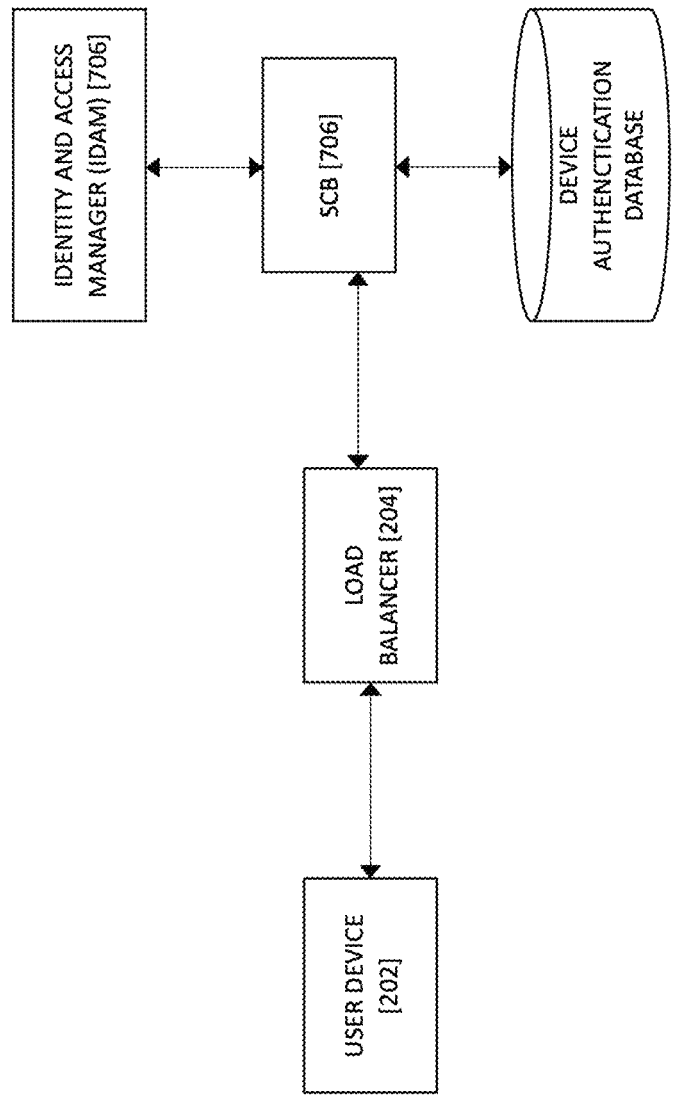
FIG. 7 illustrates an exemplary architecture diagram for facilitating device registration procedure, in accordance with exemplary embodiments of the present invention.

Referring to FIG. 7 illustrates an exemplary architecture diagram for facilitating device registration procedure, in accordance with exemplary embodiments of the present invention. An illustrated, the one or more user devices [202] transmits an authentication request (e.g., ZLA request) to an Identity and Access Management System (IDAM [210]) with the user device identifier (example, IMEI or RSN, etc.). The IDAM [210] returns an authentication token with a time to expiry in response to the authentication request (e.g., ZLA request). The one or more user devices [202] then requests a registration request to the Registry cluster (e.g., stateful connections broker (SCB)) of the M2M framework using the user device identifier and the authentication token as password. The Registry Cluster validates the user device identifier and the authentication token with the IDAM [210], and upon successful validation the IDAM [210] returns a positive response to the registry cluster.

The Registry Cluster's response to one or more user devices [202] comprises of a new username, an encrypted authentication token as password, along with a cluster identifier encrypted in the username. The authentication token contains username and cluster identifier. Upon expiry of the authentication token password, the one or more user devices [202] requests for a new authentication token password from the Registry cluster. The one or more user devices [202] connects to the IoT M2M platform via the Load balancer [204] which in turn routes the connection request to a specific cluster based on the cluster identifier received from Registry cluster. The IoT M2M platform decrypts the authentication token password, collects the username and the cluster identifier from its claims and authenticates the connection request.

Figure 8:
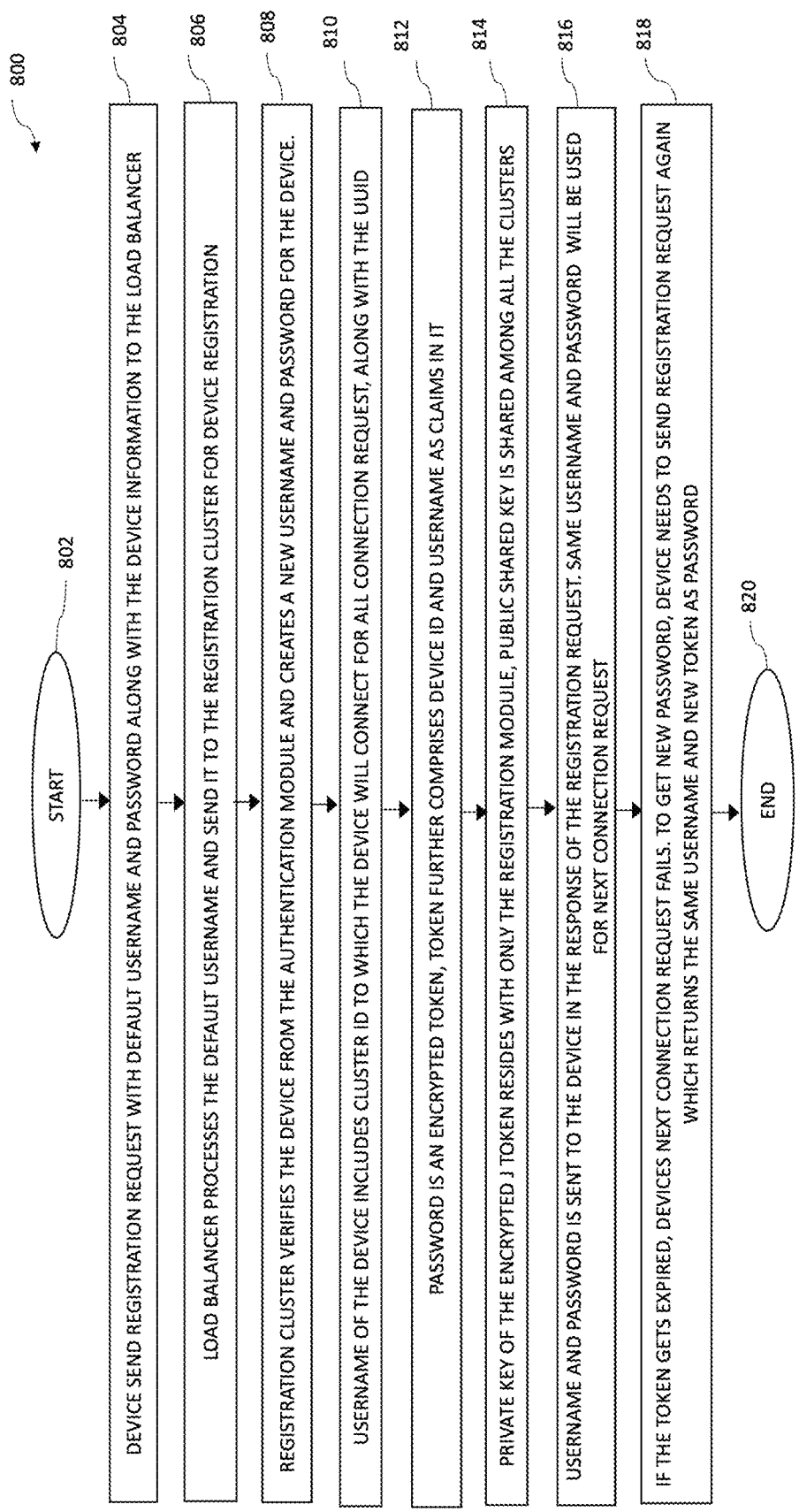
FIG. 8 illustrates an exemplary implementation of a device registration procedure, in accordance with exemplary embodiments of the present invention.

Referring to FIG. 8 illustrates an exemplary implementation of a device registration procedure, in accordance with exemplary embodiments of the present invention. The exemplary implementation starts at 802. At 804, the one or more user devices [202] send a registration request with a default username and a default password along with the devices' information to the load balancer [204]. At 806, the load balancer [204] processes the default username and sends it to the registration cluster [208] for the registration of the user device with the IoT network. At 808, the registration cluster [208] verifies the one or more user devices [202] from the authentication server [214] and creates a new username and a new password for the one or more user devices [202]. At 810, the authentication server [214] creates the username of the one or more user devices [202] comprising of a cluster identifier to which the device will connect for all connection requests, along with the UUID. At 812, the authentication server [214] creates a password which is an encrypted token, the token further comprises of the user device identifier and the username.

At 814, while a private key of the encrypted token resides with the registration cluster [208] only, a public shared key is shared with each of the one or more clusters [206] of the IoT network. At 816, the username and password are sent to the one or more user devices [202] in response to the first registration request, said username and password are used by the one or more user devices [202] at time of transmitting the next connection request. At 818, in event the token expires, the one or more user devices [202] next connection request fails. Thus, in order to obtain a new password, the one or more user devices [202] retransmits a registration request to the Registration cluster [208] via the load balancer [204] which returns the same username and new token as password. The exemplary implementation completes at 820.

Figure 9:
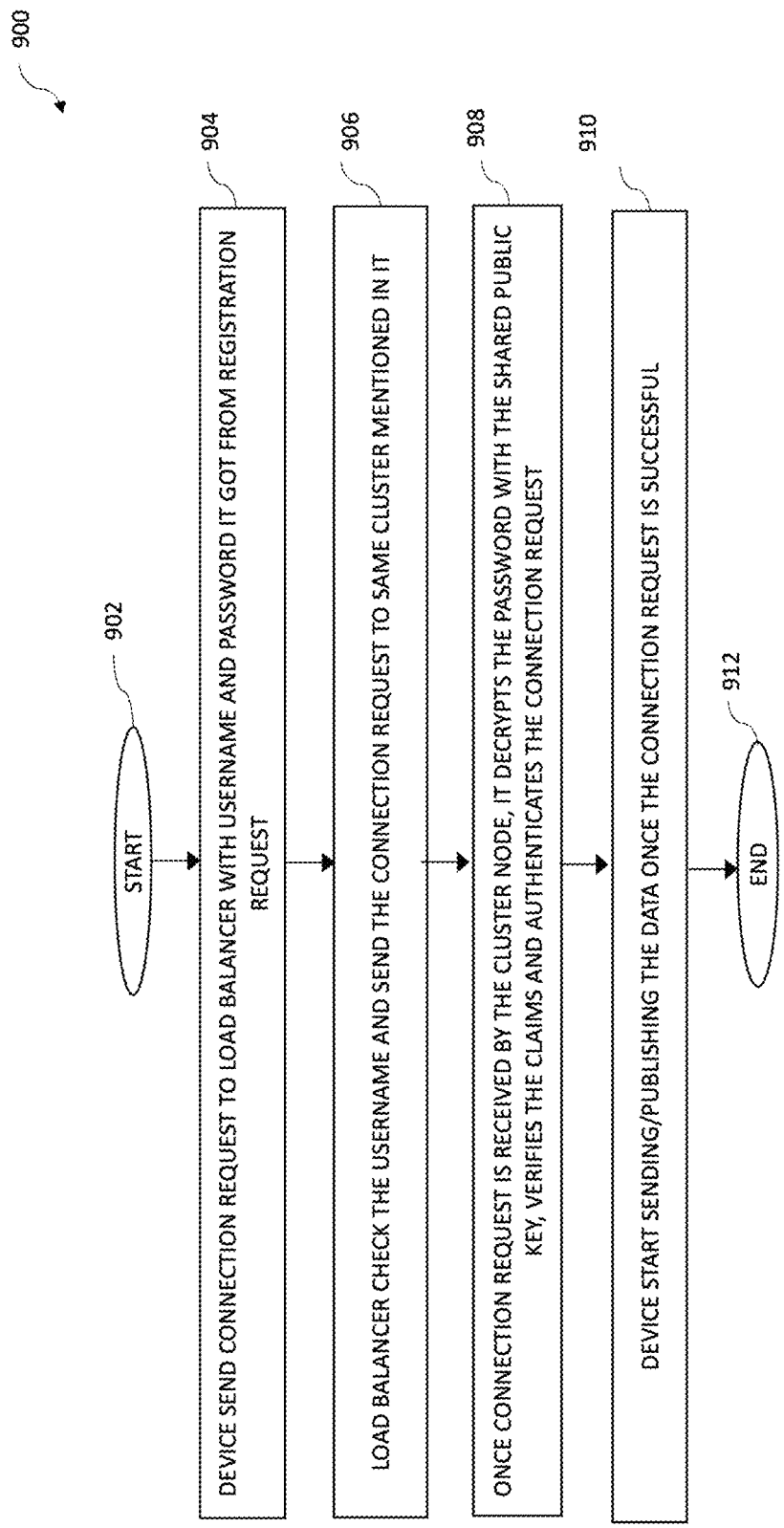
FIG. 9 illustrates an exemplary implementation of a device connection procedure, in accordance with exemplary embodiments of the present invention.
Figure 10:
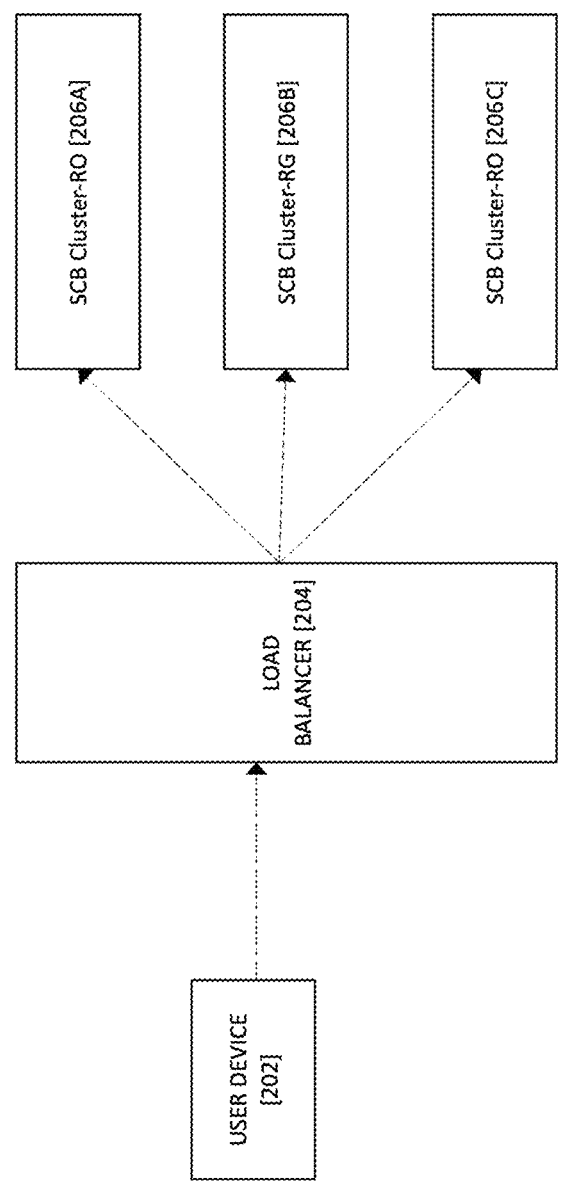
FIG. 10 illustrates an exemplary illustration of a load balancer distributed device based on the cluster ID like RO, RG, etc., in accordance with exemplary embodiments of the present invention.

Referring to FIG. 9 illustrates an exemplary implementation of a device connection procedure, in accordance with exemplary embodiments of the present invention. The exemplary implementation starts at 902. At 904, the one or more user devices [202] send a connection request at the load balancer [204], the connection request comprising the username and the password received by the one or more user devices [202] in response to the first registration request from the registration cluster [208]. At 906, the load balancer [204] processes the username in the connection request and sends the connection request to the cluster associated with the cluster identifier in the username of the connection request. At 908, once the connection request is received by said cluster, it decrypts the password with the shared public key, verifies the claims of the one or more user devices [202], and authenticates the connection request. At 910, the one or more user devices [202] start sending/publishing the data once the connection request is successful and starts availing one or more services from the cluster of the IoT network. Referring to FIG. 10 illustrates an exemplary illustration of a load balancer [204] distributed device based on the cluster ID like RO, RG, etc., in accordance with exemplary embodiments of the present invention.

In an exemplary embodiment, the configuration of the load balancer [204] is described as below. The load balancer [204] distributes the stateful connections broker (SCB) load among multiple stateful connections broker (SCB) Clusters based on the cluster identifier (Cluster ID), which comes as a part of the username (USERNAME) in TOPIC in the connection request. Further, the username is present in the TOPIC at a specific level, for instance, at level 4. Accordingly, illustrated below is an exemplary format of the connection request in Table 1:

TABLE 1

Username -> ClusterID_RSN
Password -> XXXXXXXXXX
TOPIC -> /...<1>/...<2>/...<3>/ClusterID_RSN/..../.../

The present invention also encompasses using pre-trained models, for instance, artificial intelligence-based systems, for utilizing explicitly and/or implicitly trained classifiers, can in connection with performing inference and/or probabilistic determinations and/or statistical-based determinations as in accordance with one or more aspects of the disclosed subject matter as described herein. For example, the pretrained models are used, via proactive and predictive M2M device registration context and rule engine component, to automatically predict the data with device context and rules and proactively take decision for action based on the on the framework events, and to automatically send the data to the right stakeholders, to automatically recommends action to other users, and automatically update each rule. In another instance, the pretrained models are used, via M2M device framework context and rule engine component, to automatically learn and create actions based on the events associated with the IoT device. The pretrained model's intelligent component in the rule engine shall learn data patterns from IoT device data to automatically determine a trend in action change, to automatically predict a time to trigger action based on the events and to automatically initiate the action based on the time.

Thus, the novel solution of the present invention provides a system and method for providing one or more services to one or more user devices [202] in an IoT network in a scalable M2M framework that can support that can support cognitive solution for numerous user devices (e.g., IoT devices) wherein the system can have a single common framework capable of scaling up without changing the endpoints on device side. Thus, the solution of the present invention allows M2M-related platforms to communicate with each other and to scale horizontally using a clustered 'plug and play' concept by routing the connection requests from the load balancer [204] to different platforms (clusters) and simultaneously connect to multiple/clustered platforms to support authentication and authorization for multi-distribution messaging to N-number of publish and subscribe verticals that support self-registration of devices using dynamic authentication (such as ZLA (Zero Level Authentication)) and authorization.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the invention herein, whereby it is to be distinctly understood that the foregoing descriptive matter to be implemented merely as illustrative of the invention and not as limitation.

We claim:

1. A method of providing one or more services to one or more user devices in an IoT network, the method comprising:
receiving, at a load balancer of the IoT network, a connection request from the one or more user devices, wherein
the IoT network comprises of one or more clusters, each of the one or more clusters is associated with a unique cluster identifier,
the connection request comprises at least a username, the username being a combination of at least a cluster identifier and a user device identifier,
the connection request is stateful request, and
the one or more user devices being associated with a cluster identifier assigned by an authentication server;
determining, by the load balancer, a cluster identifier based on the connection request; and
routing, by the load balancer, the connection request to at least one target cluster from the one or more clusters based on the determined cluster identifier to provide the one or more services to the one or more user devices.

2. The method as claimed in claim 1, the method further comprising:
receiving, at the at least one target cluster, the connection request from the load balancer;
decrypting, by the at least one target cluster, a second connection request using a shared public key;
providing, by the at least one target cluster, the one or more services to the one or more user devices based on the decryption.

3. The method as claimed in claim 1, further comprising:
receiving, at a load balancer of the IoT network, a first registration request from the one or more user devices prior to receiving the connection request, wherein the first registration request comprises at least a user device identifier;
routing, by the load balancer, the first registration request to a registration cluster based on the user device identifier;
assigning, by the registration cluster, the username and a password to the one or more user devices, wherein
the password is an encrypted combination of the user device identifier and the username; and
transmitting, by the registration cluster, the password and the username assigned to the one or more user devices.

4. The method as claimed in claim 3, further comprising:
receiving, from the one or more user devices, an authentication request comprising the user device identifier prior to receiving the registration request at an Identity and Access Management System (IDAM);
validating, by a central authentication platform, a connection capability of the one or more user devices; and
assigning, by the central authentication platform, a token to the one or more user devices, said token being associated with a time period.

5. The method as claimed in claim 4, wherein the first registration request received at the load balancer further comprises of the token.

6. The method as claimed in claim 4, the method further comprising validating, by the registration cluster, the first registration request based on the token, wherein the username and the password is assigned to the one or more user devices based on the validation.

7. The method as claimed in claim 4, wherein the one or more user devices request the central authentication platform, for a new token upon an expiration of the time period of the token.

8. A system for providing one or more services to one or more user devices in an IoT network, the system comprising:
a processor;
a memory storing instructions, which when executed by the processor, cause the system to:
provide the one or more services to the one or more user devices using one or more clusters, wherein each of the one or more clusters is associated with a unique cluster identifier; and
a load balancer connected to the one or more clusters, said load balancer being configured to:
receive a connection request from the one or more user devices, wherein
the connection request comprises at least a username, the username being a combination of at least a cluster identifier and a user device identifier,
the connection request is stateful request, and
the one or more user devices being associated with the cluster identifier assigned by an authentication server,
determine the cluster identifier based on the connection request, and
route the connection request to at least one target cluster from the one or more clusters based on the determined cluster identifier.

9. The system as claimed in claim 8, wherein the processor is further configured to cause the system to:
receive the connection request from the load balancer;
decrypt a second connection request using a shared public key; and
provide the one or more services to the one or more user devices based on the decryption.

10. The system as claimed in claim 8, wherein the load balancer is further configured to:
receive a first registration request from the one or more user devices prior to receiving the connection request, wherein the first registration request comprises at least a user device identifier; and
route the first registration request to a registration cluster based on the user device identifier.

11. The system as claimed in claim 10, the system further comprising the registration cluster connected to the load balancer said registration cluster being configured to:
receive the first registration request from the load balancer;
assign the username and a password to the one or more user devices, wherein
the password is an encrypted combination of the user device identifier and the username; and
transmit the password and the username to the one or more user devices.

12. The system as claimed in 10 further comprising an Identity and Access Management System (IDAM) configured to receive, from the one or more user devices, an authentication request comprising the user device identifier prior to receiving the registration request.

13. The system as claimed in 12 further comprising a central authentication platform connected to the IDAM, said central authentication platform configured to:
validate a connection capability of the one or more user devices; and
assign a token to the one or more user devices, said token being associated with a time period.

14. The system as claimed in claim 13, wherein the first registration request received at the load balancer further comprises the token.

15. The system as claimed in claim 13, wherein the registration cluster is further configured to validate the first registration request based on the token, wherein the username and the password is assigned to the one or more user devices based on the validation.

16. The system as claimed in claim 13, wherein the one or more user devices is configured to requests the central authentication platform for a new token upon an expiration of the time period of the token.

\* \* \* \* \*